US012345093B2

(12) United States Patent
Phillips

(10) Patent No.: US 12,345,093 B2
(45) Date of Patent: Jul. 1, 2025

(54) ARCHITECTURAL COVERING WITH WOVEN MATERIAL

(71) Applicant: Hunter Douglas Inc., Pearl River, NY (US)

(72) Inventor: Erick A. Phillips, Denver, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 771 days.

(21) Appl. No.: 17/605,604

(22) PCT Filed: Apr. 14, 2020

(86) PCT No.: PCT/US2020/028114
§ 371 (c)(1),
(2) Date: Oct. 22, 2021

(87) PCT Pub. No.: WO2020/219302
PCT Pub. Date: Oct. 29, 2020

(65) Prior Publication Data

US 2022/0205147 A1 Jun. 30, 2022

Related U.S. Application Data

(60) Provisional application No. 62/838,596, filed on Apr. 25, 2019.

(51) Int. Cl.
*E06B 9/264* (2006.01)
*D03D 15/283* (2021.01)
(Continued)

(52) U.S. Cl.
CPC ........... *E06B 9/264* (2013.01); *D03D 15/283* (2021.01); *D03D 15/47* (2021.01); *D03D 15/54* (2021.01);
(Continued)

(58) Field of Classification Search
CPC ..... E06B 2009/2429; E06B 2009/2452; E06B 9/34; E06B 9/264; E06B 9/262;
(Continued)

(56) References Cited

U.S. PATENT DOCUMENTS 2,063,853 A * 12/1936 Rice ........................ D03D 27/12 139/400
2,313,508 A * 3/1943 Carman .................... E06B 3/62 156/266
(Continued)

FOREIGN PATENT DOCUMENTS

CN 105442150 A 3/2016
CN 106660304 A † 5/2017
(Continued)

OTHER PUBLICATIONS

International Search Report and Written Opinion issued in PCT/US2020/028114 Dated Apr. 22, 2021 (9 pages).
(Continued)

*Primary Examiner* — Johnnie A. Shablack
(74) *Attorney, Agent, or Firm* — Dority & Manning, P.A.

(57) ABSTRACT

A covering for an architectural feature includes a woven material. The woven material is made at least partially from binder yarns to form a woven fabric. The binder yarns are heated after the fabric is woven to a temperature sufficient to cause the binder yarns to bond and fuse to adjacent yarns at crossover points. The woven material is inherently resistant to fraying and/or unraveling.

22 Claims, 3 Drawing Sheets

(51) Int. Cl.

| | |
|---|---|
| ***D03D 15/47*** | (2021.01) |
| ***D03D 15/54*** | (2021.01) |
| ***D03D 15/587*** | (2021.01) |
| ***E06B 9/34*** | (2006.01) |
| *E06B 9/24* | (2006.01) |

(52) U.S. Cl.
CPC ............. *D03D 15/587* (2021.01); *E06B 9/34* (2013.01); *D10B 2503/03* (2013.01); *E06B 2009/2452* (2013.01)

(58) Field of Classification Search
CPC .. D10B 2503/03; D03D 15/283; D03D 15/47; D03D 15/54; D03D 15/587; D03D 1/007
See application file for complete search history.

(56) References Cited

U.S. PATENT DOCUMENTS 2,349,226 A * 5/1944 Thomas .................... E06B 9/54 160/391
2,444,115 A * 6/1948 Reed ................. A61F 13/01034 156/88
2,887,132 A * 5/1959 Manning .............. D03D 15/267 139/420 C
5,305,813 A 4/1994 Poole
5,313,999 A 5/1994 Colson et al.
5,339,883 A * 8/1994 Colson .................... E06B 9/262 160/84.05
5,392,832 A * 2/1995 Colson .................... E06B 9/262 160/176.1 V
5,394,922 A * 3/1995 Colson ................ B29C 66/8322 160/DIG. 7
5,436,064 A * 7/1995 Schnegg ................. E06B 9/266 442/314
5,718,966 A * 2/1998 Gray ..................... D06M 14/32 428/192
6,068,039 A 5/2000 Judkins
6,159,875 A * 12/2000 Jetzer ........................ D06P 1/44 442/132
6,582,794 B1 * 6/2003 Fransen ................. D03D 11/00 428/101
7,347,245 B2 * 3/2008 Graichen ............... D04B 19/00 160/84.04
7,404,429 B2 * 7/2008 Graichen .................. E06B 9/36 160/84.04
7,730,927 B2 * 6/2010 Graichen ............... D04B 21/08 160/84.04
7,757,743 B2 * 7/2010 Graichen .................. E06B 9/36 160/84.04
7,836,936 B2 * 11/2010 Graichen .................. E06B 9/36 160/84.04
7,897,018 B2 * 3/2011 O'Connor ................. D21F 7/08 162/902
7,971,624 B2 7/2011 Harper et al.
8,056,373 B2 * 11/2011 Kazuma .................. E06B 9/266 66/196
8,215,073 B2 * 7/2012 Gorman .................... E06B 9/02 160/368.1
8,622,112 B2 * 1/2014 Tremaine, III ......... E06B 9/581 160/264
9,016,346 B2 * 4/2015 Cha ........................ A47H 5/032 160/84.05
9,022,090 B2 * 5/2015 Cha ........................ A47H 5/032 160/84.05
9,175,509 B2 * 11/2015 Clarren ..................... E06B 9/24
9,282,845 B2 * 3/2016 Byun ........................ E06B 9/42
9,512,671 B2 * 12/2016 Cha ........................ D03D 11/00
10,457,015 B1 * 10/2019 Chen ....................... E04H 15/54
10,975,616 B2 4/2021 Colson et al.
11,243,337 B2 * 2/2022 Malkan .................. D03D 19/00
11,821,260 B2 * 11/2023 Colson ................... D03D 11/02
11,905,626 B2 * 2/2024 Liao ......................... D03D 1/00
2001/0039158 A1 11/2001 Swers et al.
2003/0019590 A1 1/2003 Fransen
2003/0154679 A1 * 8/2003 Swiszcz .................. E04B 9/045 52/506.07
2003/0194531 A1 10/2003 Fransen
2004/0224093 A1 11/2004 Nishimura et al.
2008/0127598 A1 * 6/2008 Kallstrom ............. F41H 5/0485 52/656.7
2009/0139667 A1 * 6/2009 Graichen ................ E06B 9/384 160/173 V
2011/0120661 A1 * 5/2011 Kim ........................ E06B 9/386 139/383 R
2011/0284173 A1 * 11/2011 Neher ...................... D04H 3/14 160/369
2011/0297332 A1 12/2011 Rupel
2012/0190260 A1 * 7/2012 Morishita ................ D04B 1/18 442/301
2013/0260104 A1 * 10/2013 Dua ...................... B29C 66/133 428/196
2015/0126090 A1 * 5/2015 Nelson .................... B32B 5/026 28/112
2015/0247267 A1 * 9/2015 Corey .................... D03D 15/56 428/221
2016/0215558 A1 * 7/2016 Byun ..................... D03D 15/43
2016/0237598 A1 8/2016 Henssen et al.
2016/0237602 A1 † 8/2016 Pritchett
2018/0282911 A1 * 10/2018 Vila Bros ................ D02G 3/36
2020/0080370 A1 * 3/2020 Rahn ...................... D04B 21/10
2021/0355612 A1 * 11/2021 Bauer .................... D03D 1/007
2022/0205147 A1 * 6/2022 Phillips ................ D03D 15/587

FOREIGN PATENT DOCUMENTS

| | | | | |
|---|---|---|---|---|
| CN | 107460598 | A | † | 12/2017 |
| CN | 105144516 | B | † | 10/2018 |
| CN | 108708032 | A | † | 10/2018 |
| JP | 8-188938 | A | † | 7/1996 |
| JP | 2000220034 | | | 8/2000 |
| JP | 2000-290856 | A | | 10/2000 |
| KR | 100790026 | | | 1/2008 |
| KR | 10-2010-0061638 | A | | 6/2010 |
| KR | 10-1137485 | B1 | | 4/2012 |
| KR | 10-1249357 | B1 | | 4/2013 |
| KR | 20150065520 | | | 6/2015 |
| KR | 10-1669016 | B1 | | 11/2016 |
| KR | 10-1676678 | B1 | | 11/2016 |
| KR | 101672447 | | | 11/2016 |
| WO | WO 98/06570 | A1 | | 2/1998 |

OTHER PUBLICATIONS

Chinese Office Action issued in Application No. CN 202080038485.7 Dated Dec. 19, 2022 (5 pages).
Supplemental International Search Report and Written Opinion issued in PCT/US2020/028114 Dated May 3, 2023 (8 pages).
Taiwanese Examiner's Examination Opinion and Search Report Corresponding to Application No. 109113511 on Aug. 17, 2023 (19 pages).

* cited by examiner
† cited by third party

ARCHITECTURAL COVERING WITH WOVEN MATERIAL

RELATED APPLICATION

The present application is a national phase of and claims priority to PCT/US2020/028114 filed on Apr. 14, 2020, which claims priority to U.S. Provisional Application Ser. No. 62/838,596 filed on Apr. 25, 2019, both of which are incorporated herein in their entirety by reference thereto.

FIELD OF THE INVENTION

The present disclosure relates to woven fabrics and to coverings for architectural features that include woven fabrics.

BACKGROUND

Various different coverings exist for architectural features or openings, which may include windows, doorways, archways, and the like. The coverings, for instance, can provide privacy, can block views from the outside, can provide thermal insulation, and/or can be aesthetically pleasing. Coverings for architectural features can take many forms and can include a fabric or other material that is designed to be suspended adjacent to an architectural feature by operating mechanisms that may be capable of extending and retracting the fabric or material.

Coverings for architectural features, for instance, can be configured to be extended and retracted in numerous ways. In one embodiment, for instance, the covering can include a roller that winds and unwinds material for retracting and extending the covering (e.g., about or from the roller, respectively). Other coverings include stacking type coverings in which the bottom of the covering is brought closer to the top of the covering to retract or open the covering from an extended or closed position or configuration. For instance, Roman shades hang substantially flat when lowered and include battens or other stiffening elements which cause the covering fabric to gather in generally uniform folds when the covering is retracted. Still another type of covering is referred to as a cellular shade. Cellular shades are made from a series of cells which generally collapse or fold into stacks when the covering is retracted.

Although various woven materials, e.g., sheer woven materials, have been used in the past to produce coverings for architectural features, such woven materials can have a tendency to fray or unravel. Woven materials have a tendency to fray or unravel because they are held together solely due to cohesion and frictional forces between sets of yarns forming the woven material. If there is no structure holding the sets of yarns together, unraveling and/or fraying of current woven materials is likely. Fraying and/or unraveling may occur in such fabrics particularly when they are cold cut, e.g., cut with scissors. As such, typically such woven materials have to be cut with a laser or hot-knife in order to heat seal or cauterize the cut edges by melting the material at the cut edges to form a sealed beaded edge. Such techniques generally take more time, and use more expensive equipment, and are generally more costly than cold cutting techniques. Thus, a need currently exists for a woven material that is inherently resistant to unraveling or fraying. Preferably, the woven material may also affect or control visible light transmission.

SUMMARY

The present disclosure is directed to a person of ordinary skill in the art. The purpose and advantages of the architectural panel and covering will be set forth in, and be apparent from, the drawings, the description and claims that follow. The summary of the disclosure is given to aid an understanding of the panel and covering, and not with an intent to limit the disclosure or the invention. It should be understood that each of the various aspects and features of the disclosure may be advantageously used separately in some instances, or in combination with other aspects and features of the disclosure and other instances. Accordingly, while the disclosure is presented in terms of embodiments, it should be appreciated that individual aspects of any embodiment can be utilized separately, or in combination with aspects and features of that embodiment or any other embodiment. In accordance with the present disclosure, variations and modifications may be made to the architectural panel or covering to achieve different effects.

The present disclosure is generally directed to a woven material, e.g., a visible light transmitting material, for use in a covering for architectural features, which may include windows, doorways, archways, and the like. For example, a covering includes a panel made from a woven material. The woven material is designed and engineered to control light transmission through the material for providing a desired visual effect while having improved edge integrity and being inherently resistant to unraveling or fraying. Inherent resistance to fraying or unraveling means that the woven material can be cold cut without subsequent fraying or unraveling of its edges.

In one aspect, the covering for an architectural feature includes a woven material that extends vertically. For example, the woven material extends vertically from a head rail and extends from a top of the covering to a bottom of the covering. Various different types of coverings can incorporate the woven material as described above. In one aspect, for instance, the covering includes a roller that is engaged with the woven material. The roller is configured to rotate for winding and unwinding the woven material thereby causing the material to retract and extend.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
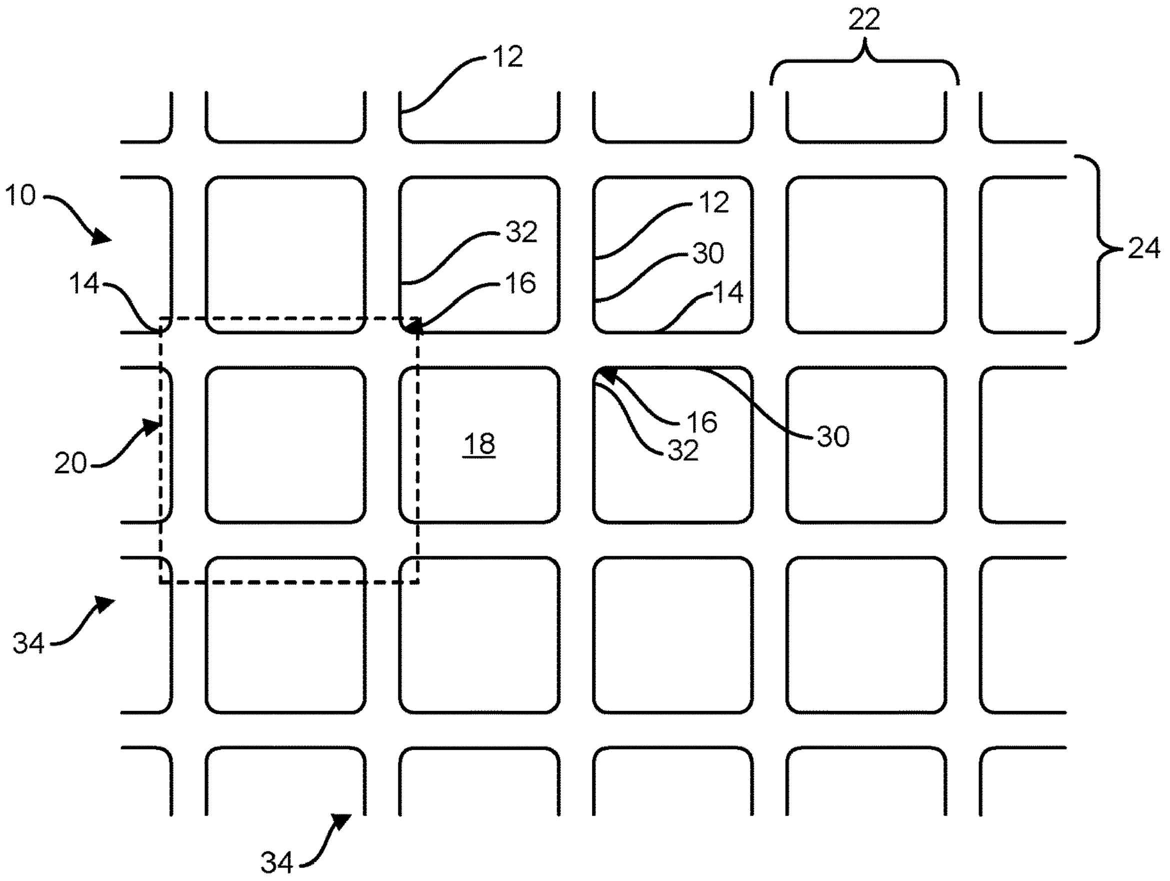
FIG. 1 is a plan view of one example of an embodiment of a woven material made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of examples of embodiments only, and is not intended as limiting the broader aspects of the present disclosure.

The present disclosure generally relates to coverings for architectural features which include, for example, windows, doorframes, archways, and the like. The coverings are particularly useful for windows to provide an aesthetic look and desirable shading and privacy. In accordance with the present disclosure, the coverings generally include a woven material. The woven material is constructed so as to have improved edge integrity and be inherently resistant to unraveling or fraying. For instance, the material is well suited to being cut without subsequent fraying of its edges. Coverings for architectural features, for example, are typically exposed to forces in the vertical direction when extended or retracted, when pulled upon by a user, or when subjected to the force of gravity. Coverings are also subjected to forces in the horizontal direction when extended or retracted or when being moved or shifted by a user. The improved edge integrity and inherent resistance to unraveling or fraying of the woven material of the present disclosure enables the woven material to be cold cut, and further can prevent unraveling or fraying in case of tears in the material due to forces imposed on the material. Due to the inherent resistance to unraveling or fraying, the need for heat sealing or cauterizing cut edges of the woven material or cutting the material with a laser or hot-knife is eliminated.

In addition to excellent dimensional stability characteristics, in one aspect, the woven material is constructed to allow visible light to pass through the woven material while still providing a distinctive, unique, and/or appealing effect. As will be explained in greater detail below, the woven material can be used in all different types of coverings for architectural features. For instance, the amount of visible light transmission through the woven material of the present invention can range from sheer (1) to semi-sheer (2), semi-opaque (3), opaque (4) (i.e., room darkening and/or preventing view-through in an architectural covering), or blackout (5) on an opacity scale of 1-5, depending on the desired control of light transmission. Sheer fabric generally has enhanced view-through and/or clarity of visible light, particularly as compared to opaque fabrics, and can be transparent or semi-transparent. Transparency can be understood in the art of architectural-structure coverings as having the property of transmitting visible light without appreciable scattering so that bodies lying beyond are seen clearly. Often, sheer fabric is semi-transparent, i.e., partially or imperfectly transparent, and may be fully transparent when wet. At the other end of the opacity scale, blackout woven materials generally prevent any transmission of visible light through the material. Semi-sheer woven materials allow reduced visible light transmission compared to sheer woven materials, but may be semi-transparent. Semi-opaque woven materials allow reduced visible light transmission compared to semi-sheer woven materials, and also may allow very little to no ability to view bodies lying beyond the material.

In one aspect, the woven material is formed from a woven fabric. The woven fabric is made from various different types of thermoplastic yarns. The type of yarn, the size of the yarn, and the color of the yarn can be selected depending upon various factors. For instance, the type and size of yarn can be selected in order for the material to fuse at crossover points between the yarns such that the material is inherently resistant to fraying or unraveling. In addition, the type and size of the yarns can be selected so that the fabric will extend and retract such as on a roller or other mechanical device.

In general, the fabric of the present disclosure is a woven fabric containing warp yarns interwoven with weft yarns. The woven fabric has longitudinal edges and lateral edges. The weft yarns intersect with the warp yarns to define crossover points. At least certain of the warp or weft yarns comprise binder yarns. The binder yarns define an outer surface made from a low melting temperature polymer. In accordance with the present disclosure, the binder yarns are bonded with adjacent yarns at the crossover points for preventing the woven fabric from unraveling along the longitudinal edges.

In one aspect, the woven fabric is a non-laminated, free standing fabric, meaning that the fabric is not laminated to any other layers or fabrics. The woven fabric is constructed with sufficient strength and stability that further layers are not needed that may negatively impact the appearance or light controlling properties of the fabric.

Referring to FIG. 1, one aspect of a woven material 10 made in accordance with the present disclosure is shown. As illustrated in the exemplary embodiment of FIG. 1, the woven material 10 may form a sheer material that allows visible light to pass through. The exemplary woven sheer material illustrated in FIG. 1 is not intended to limit the woven material 10 of the present invention. For instance, the woven material 10 of the present invention can be blackout, opaque, semi-opaque, semi-sheer, or sheer depending on the desired control of light transmission. The weave pattern of the woven material 10 may form a grid-like pattern as illustrated in FIG. 1. The grid-like pattern may have interstitial openings 18 of any shape, or there may be no visible openings between intersecting yarns forming the grid-like pattern. In the illustrative embodiment shown in FIG. 1, the grid-like pattern is an orthogonal grid pattern comprised of columns 22 and rows 24 forming a pattern of squares or rectangles 20 surrounding interstitial openings 18. As shown in FIG. 1, the columns 22 of the grid-like pattern are parallel to each other in the lengthwise direction, and the rows 24 of the grid-like pattern are parallel to each other in the widthwise direction.

Figure 2:
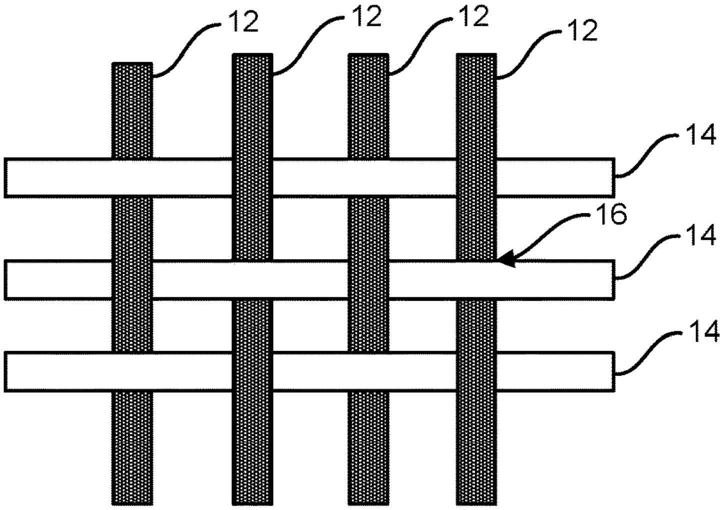
FIG. 2 is a schematic plan view of the plain weave of the woven material of FIG. 1.

The woven material 10 as shown in FIG. 1 can be made using various methods and techniques. In one aspect, for instance, the woven material 10 is a woven fabric formed from a parallel series of warp yarns 12 and a parallel series of weft yarns 14 oriented orthogonal to the warp yarns 12. In the material 10 illustrated in FIG. 1 the warp yarns 12 extend in the lengthwise direction and the weft yarns 14 extend in the widthwise direction. In some aspects, e.g., as shown in FIG. 1, the woven fabric of the material 10 is formed by a plain weave. FIG. 2 shows a schematic illustration of a plain weave having warp yarns 12 and weft yarns 14 cross at right angles at each crossover point 16, forming a simple crisscross pattern. Each weft yarn 14 crosses the warp yarns 12 by going over one, then under the next, and so on. The next weft yarn 14 goes under the warp yarns 12 that its neighbor went over, and vice versa. Thus, the woven fabric of the material 10 has the same number of ends per inch as picks per inch. As such, in some aspects, the woven material 10 can be an organza fabric. Woven organza fabric is a thin, plain weave, sheer fabric, i.e., transparent or semi-transparent, having enhanced view-through or clarity of visible light as compared to opaque fabrics due to the fineness of the yarn used to form the organza. Woven organza fabric inherently filters ultraviolet light due to the high density of yarns in the fabric. Thus, the organza fabric can have enhanced view-through or clarity of visible light, e.g., be semi-transparent or transparent, while also being UV protective.

It should be understood, however, that the above woven fabric represents only one aspect of a fabric made in accordance with the present disclosure as shown in FIG. 1. Various other woven structures may be used to produce a fabric to form the woven material 10 of the present invention having the desired edge integrity and inherent resistance to unraveling or fraying. For example, in other aspects (not shown), the woven material 10 can be a woven fabric formed by a basket weave. The basket weave may be woven as a variation of a plain weave in which two or more yarns are bundled and then woven as one in the warp (lengthwise) direction, the weft (widthwise) direction, or both. In a balanced or plain basket weave, the woven fabric includes the same number of yarns bundled in the warp direction as the number of yarns bundled in the weft direction. For example, a basket weave can include two warp yarns 12 bundled together and woven as one and/or two weft yarns 14 bundled together and woven as one in an over-under pattern similarly to the plain weave. In other embodiments, the woven fabric of the material 10 is formed by a twill weave, for example, a 3×1 twill weave. In still other embodiments, the woven fabric of the material 10 is formed by a dobby weave, or any other suitable weaving pattern which is typically susceptible to unraveling and/or fraying.

As described above, the woven material 10 can be constructed using various different weaving techniques. The yarn density in the warp direction and in the weft direction of the woven fabric can be selected in order to construct a fabric having a desired balance of strength and view-through of visible light. For instance, increasing the yarn density can increase strength. Decreasing the yarn density, however, can increase the transparency properties and/or openness of the woven fabric depending on the size of the yarn. In some embodiments, the woven fabric can include about 22 warp yarns per centimeter (i.e., ends per centimeter) or greater. In some embodiments, the woven fabric can include about 38 warp yarns per centimeter or less. In some embodiments, the woven fabric can include from about 22 weft yarns per centimeter (i.e., picks per centimeter) or greater. In some embodiments, the woven fabric can include about 38 weft yarns per centimeter or less. Thus, in some embodiments, the woven fabric can include about 44 yarns per square centimeter or greater. In some embodiments, the woven fabric can include about 78 yarns per square centimeter or less. It will be appreciated that the foregoing yarn density values encompass increments of 1 yarn per centimeter.

At least certain of the warp yarns 12 and/or weft yarns 14 of the woven material 10 are binder yarns 30. The binder yarns 30 of the woven material 10 have an outer surface made from a low melting temperature polymer. In some aspects of the invention, the binder yarns 30 are formed in a uniform pattern throughout the woven material 10. For instance, in some aspects, the binder yarns 30 form only the warp yarns 12 of the woven material 10. In other aspects, the binder yarns 30 form only the weft yarns 14 of the woven material 10. In one illustrative embodiment, as shown in FIG. 1, all of the warp yarns 12 and all of the weft yarns 14 are formed from the binder yarns 30.

In one aspect, the yarns, including the binder yarns, are made from at least one polymer. Polymers that may be used to form the yarns include, for instance, polyesters such as polyethylene terephthalate, nylon polyamide, polyolefins such as polypropylene or polyethylene, and the like. For instance, polymers that may be used to form the yarns, including the binder yarns 30, can be low melting temperature polymers. The melting temperature of the polymer, for example, is low enough so that a yarn can be heated and fused to an adjacent yarn during a heat setting process in order to make the material resistant to fraying and/or unraveling. For example, the low melting temperature polymer may have a melting point of less than or equal to about 220° C. The melting temperature of the polymer is also high enough so that the yarns will not soften or melt when placed in a window and subjected to direct sunlight. For example, the low melting temperature polymer may have a melting point of greater than or equal to about 80° C. It will be appreciated that the foregoing temperature values encompass increments of 1° C. Moreover, the yarns, including the binder yarns 30, can be made from at least one thermoplastic polymer that is non-elastomeric. Using a non-elastomeric yarn improves the dimensional stability of the woven material 10 by resisting a stretch and/or change in shape of the woven material 10.

The size and type of yarns used to construct the woven material 10 can depend upon various factors. For example, the size and type of yarns are selected so that the fabric is resistant to unraveling along the longitudinal edges 34 of the fabric. The size and type of yarns are also selected so that the fabric is made with a desired amount of openness, i.e., with a certain number of crossover points. The size and type of yarns are also selected so that the resulting fabric has sufficient strength, sufficient flexibility and have a thickness that allows the material to extend and retract as part of an architectural covering. The size and type of yarns are also selected so that the material does not add an undesirable amount of weight to the covering. The yarns, including but not limited to the binder yarns 30, for instance, may comprise spun yarns, multifilament yarns, monofilament yarns, or mixtures thereof. For instance, the particular type of yarn can be selected based upon the desired appearance. Monofilament yarns, for instance, produce a more uniform appearance than spun yarns. The type of yarn can also be selected based upon the physical properties that are desired in the woven material 10. For example, monofilament yarns tend to be stiffer than multifilament yarns or spun yarns. Spun yarns and multifilament yarns, on the other hand, have a softer feel than monofilament yarns.

In one aspect, monofilament yarns are selected for constructing the woven material 10. For instance, monofilament yarns may be selected to form the binder yarns 30, as shown in the illustrative embodiment of FIG. 1. Monofilament yarns may be selected to increase abrasion resistance or bending stiffness of the woven material 10. In one aspect, monofilament yarns are used in one direction of the woven material 10 to increase the resistance of the material 10 to buckling. In some embodiments, the monofilament yarns, for instance, can have a diameter of greater than or equal to about 1 micron. In some embodiments, the monofilament yarns can have a diameter less than or equal to about 1000 microns. It will be appreciated that the foregoing diameter values encompass increments of 0.5 microns. In some embodiments, the monofilament yarns can generally have a denier of greater than or equal to about 10. In some embodiments, the monofilament yarns can have a denier of less than or equal to about 600 denier. It will be appreciated that the foregoing yarn denier values encompass increments of 1 denier. For example, in the exemplary sheer organza woven material 10 shown in FIG. 1, the fineness of the monofilament binder yarns 30 of the organza woven material 10 shown in FIG. 1 can contribute to the sheer, e.g., view-through of visible light, properties of the material 10. The monofilament binder yarns 30 of the sheer organza woven material 10 shown in FIG. 1 can generally have a denier of greater than or equal to about 10. The monofilament binder yarns 30 of the sheer organza woven material 10 shown in FIG. 1 can generally have a denier of less than or equal to about 30 denier. The monofilament yarns can be made from a single component ("monocomponent"), for example, monocomponent monofilament binder yarns 30 shown in FIG. 1.

Additionally, or alternatively, in some embodiments, the yarns, including but not limited to the binder yarns 30, contain bi-component or conjugate yarns having a core-and-sheath structure. In a core-and-sheath arrangement, the core component is fully surrounded by the sheath component, such as by coextruding a sheath material around a core material. For instance, the core may contain one polymer selected for its strength and high melting point, and the sheath may contain another polymer selected for its adhesion properties and a lower melting point. When the melting point of the sheath polymer is lower than that of the core polymer, the sheath may advantageously permit melt-fusing or melt-bonding of the crossover points of the binder yarns 30 of the fabric of woven material 10 via the sheath polymer while relying on the core polymer to maintain the shape and structural integrity of the fabric. Thus, the bi-component yarns can have a very fine diameter while maintaining the shape and structural integrity of the fabric. The core component of the core-and-sheath arrangement yarns can provide additional structural integrity to the yarn as compared to a monofilament yarn formed entirely from the sheath material. Furthermore, the use of a core-and-sheath arrangement yarn can provide customizability of bonding or melting temperatures based on the sheath material, in addition to customization of the sheath material to bond to various other materials as desired. For instance, in a core-and-sheath bi-component arrangement, the sheath can include a low melting temperature polymer, e.g., low melting temperature polyethylene terephthalate, while the core can include at least one polymer selected for its strength and higher melting point than the sheath component, e.g., high melting temperature polyethylene terephthalate. In some aspects, bi-component yarns can be used to increase the stiffness of the woven material 10. For example, bi-component yarns can be used in one direction to increase the stiffness of the woven material 10 in the direction of the bi-component yarns, or alternatively, bi-component yarns can be used in both directions to increase the stiffness of the woven material 10 in both the warp and weft directions.

In some embodiments, the yarns used to construct the woven material 10, such as but not limited to the binder yarns 30, are multifilament yarns. Multifilament yarns generally have greater flexibility compared to monofilament yarns, and may be selected for a woven material 10, e.g., a light diffusing material for an architectural covering, with increased flexibility in one or more directions. The number of filaments in each yarn may be selected to achieve the desired strength or tactile properties (e.g., softness and/or texture) of the fabric. For instance, in some embodiments, the multifilament yarns can contain greater than or equal to about 2 filaments per yarn. In some embodiments, the multifilament yarns can contain less than about 100 filaments per yarn. It will be appreciated that the foregoing values encompass increments of 1 filament per yarn. In some embodiments, the multifilament yarns can have a denier of about 10 or greater. In some embodiments, the multifilament yarns can have a denier of about 600 denier or less. For example, in a sheer organza fabric material, the multifilament yarns can have a denier of about 10 or greater. In a sheer organza material, the multifilament yarns can have a denier of about 30 denier or less. It will be appreciated that the foregoing yarn denier values encompass increments of 1 denier.

In further embodiments, the yarns used to construct the woven material 10, such as but not limited to the binder yarns 30, are spun yarns. Spun yarns can provide better hand-feel and elastic stretch properties as compared to monofilament and/or multifilament thermoplastic yarns. Depending on the spinning system used for the spun yarns, in some embodiments, single and plied spun yarns can have a yarn count of about Ne 6 or greater. In some embodiments, single and plied spun yarns can have a yarn count of about Ne 200 or less. It will be appreciated that the foregoing yarn count values encompass increments of 1 Ne.

In some embodiments, the yarns used to construct the woven material 10, such as but not limited to the binder yarns 30, are textured. Texturing the yarns increases the bulk and/or the stretch of the yarn. For example, monofilament or multifilament yarns can be textured by air jet texturing. Air jet texturing can result in yarns which imitate the properties of spun yarns while being less expensive and faster to make than spun yarns. Other methods of texturing the yarns may include, but are not limited to, bulking, crimping, coiling, false-twist texturing and interlacing. Any other suitable method of texturing the yarns may be used. The textures of the yarns can include, but are not limited to, boucle, slub, snarls, spirals, and corkscrews. For example, using textured binder yarns 30 in the material 10 of the present invention can increase the surface area of the crossover points 16 due to the increased bulk resulting from texturing. Increased surface area of the crossover points 16 can result in improved fusion or bonding of the binder yarns 30 at the crossover points 16 by increasing the surface area of the binder yarns 30 that are fused together, thereby improving the resistance to fraying and/or unraveling.

The yarns used to form the woven material 10, such as but not limited to the binder yarns 30, can have any suitable color. In one aspect, the yarns can be made with a dark color such as a black color or a grey color. Using darker colored yarns, for instance, may provide various advantages in some embodiments. For instance, dark colored yarns may increase visibility through the woven material 10, e.g., when used in an architectural covering. Darker colors can also reduce glitter or glisten that may occur when bright light, such as sunshine, is transmitted through the material. Use of dark yarns may be advantageous for the additional reason that sunlight (i.e., UV rays) may not degrade the materials in the covering, and the materials may better retain their strength. In other embodiments, however, a lighter color may be desired. For instance, a lighter color may make the material less noticeable when hanging within a room.

The yarns used to form the woven material 10 can be provided with any desirable color using coloring agents, such as pigments, dyes and the like. For instance, in one aspect, the yarns can be solution dyed. For example, as in the exemplary material 10 shown in FIG. 1, one or more coloring agents can be added to a molten polymer when making the fibers that are used to construct the yarns. In this manner, the coloring agent becomes dispersed and saturated throughout the yarn. The solution dying process generally works well for preparing single color yarn, which can be used to make long lasting exterior fabrics which are more resistant to ultraviolet light degradation. The embedded coloring agent or pigment may act to block UV rays and consequent UV degradation. When producing darker yarns, the coloring agent may be carbon black or other pigment.

In addition to solution dyed yarns, the yarns can also be dyed using, for example, dispersion dyes after manufacturing the yarn. For example, the yarns can be dyed by printing with a dye using, for example, a roller prior to or after constructing the fabric. One or more sides of the fabric, for instance, can be printed.

The basis weight of the woven material 10 can vary depending upon the type of yarns, the size of yarns used to make the material and the amount of openness in the material (i.e., the spacing of the yarns in the woven fabric depending on the particular weave pattern). In general, the basis weight of the material may be selected so that the material has sufficient strength and excellent dimensional stability characteristics while also not adding an undesirable amount of weight to the covering for the architectural feature. In some embodiments, the basis weight of the woven material 10 is greater than or equal to about 10 gsm. In some embodiments, the basis weight of the woven material 10 is less than or equal to about 175 gsm. It will be appreciated that the foregoing basis weight values encompass increments of 1 gsm. For example, the sheer organza fabric material 10 as shown in FIG. 1 can have a low basis weight as a result of the thin yarns used to make the organza fabric. The basis weight of the sheer organza fabric material 10 shown in FIG. 1 is greater than or equal to about 10 gsm. The basis weight of the sheer organza fabric material 10 shown in FIG. 1 is less than or equal to about 30 gsm.

After weaving the fabric of the woven material 10 including the binder yarns 30, the woven fabric is subjected to a heat setting process. The heat setting process can be carried out by a stenter machine or any other suitable heat setting process. In one exemplary heat setting process, the woven fabric is stretched across a tenter frame and held in place to maintain the dimensions of the woven fabric and prevent shrinking or distortions when heating the fabric. A conveyor on the sides of the tenter frame carries the woven fabric through an oven to heat the fabric. The fabric is heated to a temperature sufficient to melt or soften the outer surface polymer of the binder yarns 30 an amount sufficient for adjacent yarns to bond together at the crossover points 16. The heat setting process is carried out at an oven temperature that is generally equal to or greater than the melting point of the binder yarns 30. In some embodiments, the heat setting process can be carried out at an oven temperature of typically less than or equal to about 250° C., when the melting point of the binder yarns 30 is less than or equal to about 220° C. In some embodiments, the heat setting process can be carried out at an oven temperature of typically greater than or equal to about 100° C., when the melting point of the binder yarns 30 is greater than or equal to about 80° C. It will be appreciated that the foregoing temperature values encompass increments of about 1° C. In one particular embodiment, the heat setting process is carried out at a temperature of about 200° C. The conveyor that carries the tenter frame through the oven is run such that the heat setting process within the oven is carried out for a duration sufficient for the binder yarns 30 to melt or soften a sufficient amount for bonding to occur as described above, such as a duration of about 30 seconds or greater. The conveyor that carries the tenter frame through the oven can be run such that the heat setting process within the oven is carried out for a duration sufficient for the binder yarns 30 to melt or soften a sufficient amount for bonding to occur as described above, such as a duration of about 10 minutes or less. It will be appreciated that the foregoing time values for the duration of heat setting encompass increments of 5 seconds. In one particular embodiment, the heat setting process is carried out for an oven dwell time duration of about 2 minutes and 30 seconds. During the heat setting process, the binder yarns 30 are bonded with adjacent warp yarns 12 and/or weft yarns 14 at the crossover points 16 to form bonds 32. Thus, the heat setting of the woven fabric results in a woven material 10 having dimensional stability, i.e., resistance to changing shape, and inherent resistance to fraying or unraveling as a result of the bonds 32 formed at the crossover points 16.

As a result of the bonding of the binder yarns 30 to adjacent yarns, the woven fabric of the woven material 10 has improved edge integrity compared to existing woven fabrics due to its inherent ability to inhibit fraying along longitudinal edges 34 of the material 10. The fused binder yarns 30 hold the woven fabric together with greater strength than the friction and cohesion forces between the yarns alone. This inherent resistance to fraying or unraveling of the woven material 10 enables the woven material 10 to be cold cut, e.g., cut without the use of heat using scissors or the like, without subsequent fraying of its longitudinal edges 34. As such, no heat seal, bead, or any other form of bonded or cauterized edge along the longitudinal edge 34 is formed when the woven material 10 is cold cut. In contrast, many types of fabrics, such as sheer fabrics, must be cut with a laser or hot-knife in order to cauterize or heat seal the edges of the fabric to prevent fraying or unraveling of the fabric along the cut edges. Due to the bonds 32 formed by the binder yarns 30 at the crossover points 16, the longitudinal edges 34 of the woven material 10 demonstrate similar properties to other similar fabrics which are heat sealed with a beaded or cauterized edge.

Moreover, cold cutting the woven material 10 can be performed significantly faster than laser or hot-knife cutting of a sheer fabric because no formation of a heat seal is necessary. Therefore, the woven material 10 of the present invention provides a significant improvement over existing woven, e.g., sheer organza, fabrics by eliminating the need to heat seal or cauterize the edges of the material using a laser or hot knife to cut the sheet fabric, thereby reducing the amount of time required to cut and form panels of the woven material 10. Instead, the ability to cold cut the woven material 10 of the present invention, e.g., cut with a non-heated cutting device, increases the ease with which the woven material 10 can be cut by reducing the amount of time and equipment required as compared to laser or hot-knife cutting. Moreover, the bonds 32 formed at the crossover points 16 increase the structural integrity of the woven material 10, particularly along any edges of the material, as compared to existing woven fabrics by preventing yarn slippage. When exterior forces are applied to the woven material 10, the material resists being ripped or torn due to the increased strength of the woven material 10 due to the bonds 32 formed at the crossover points 16, and the material will further resist unraveling or fraying along any rips and/or tears that may occur.

Figure 3:
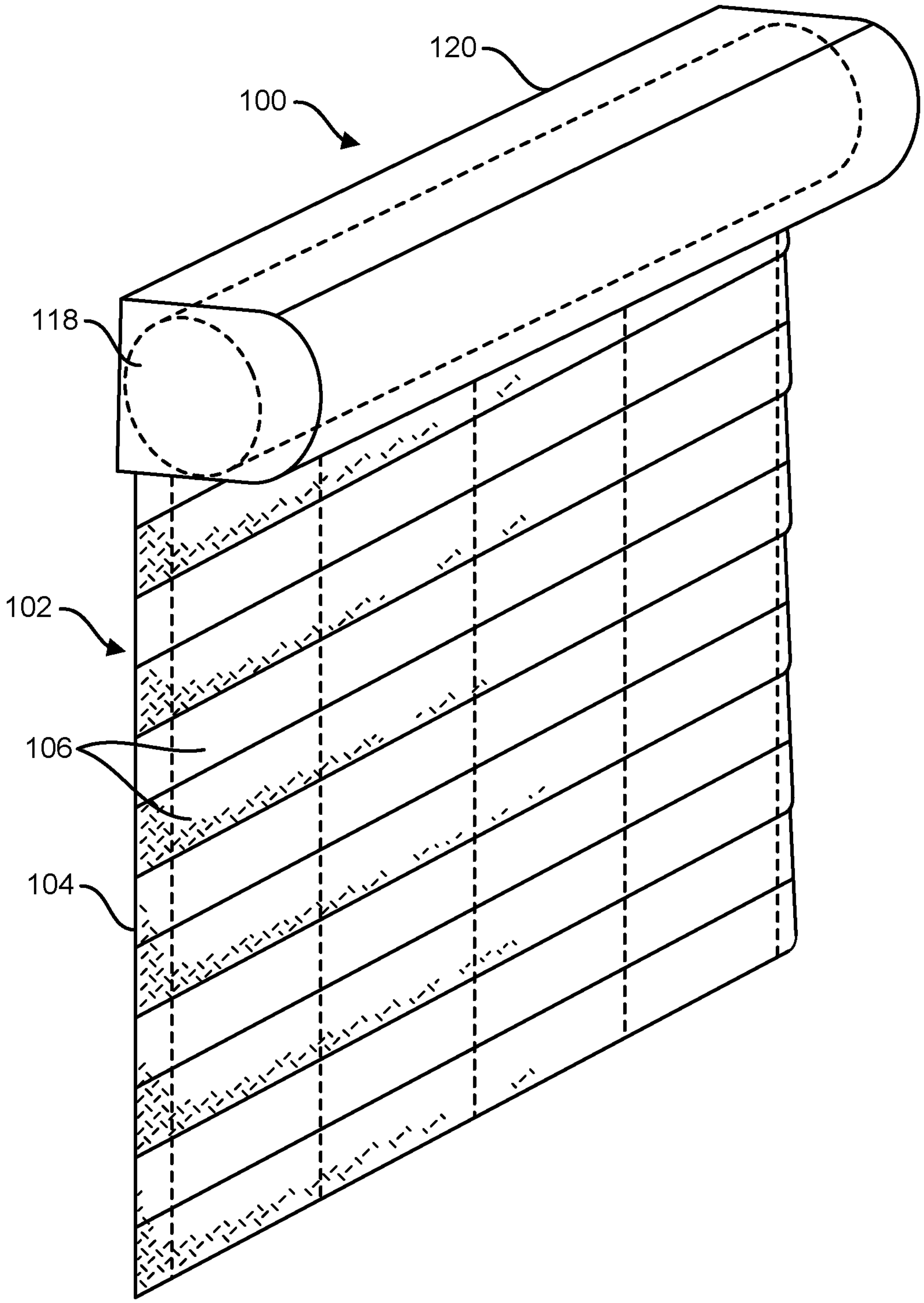
FIG. 3 is a perspective view of one example of an embodiment of a covering for an architectural feature or opening that may incorporate a woven material of the present disclosure.
Figure 4:
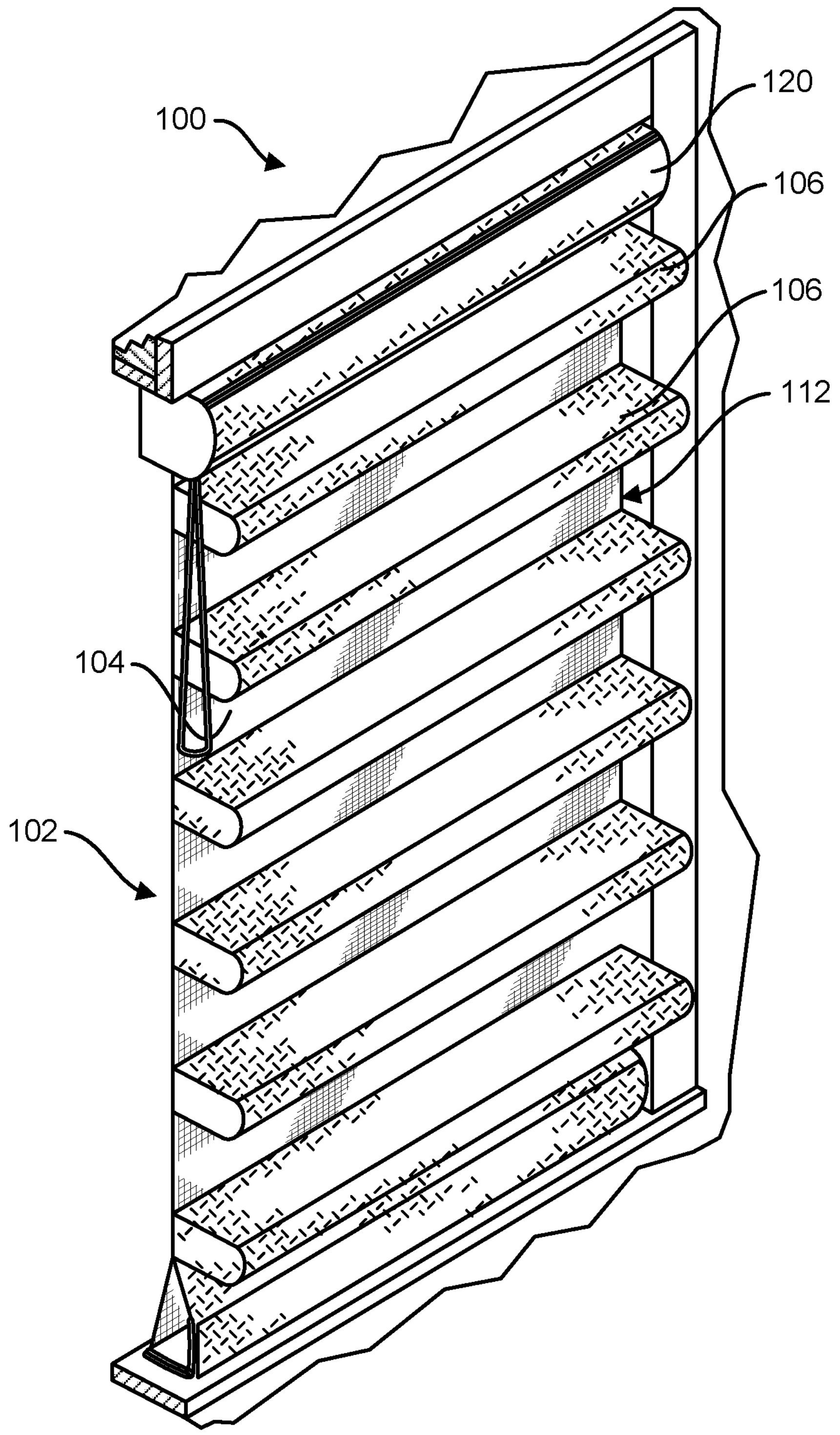
FIG. 4 is a perspective view of the covering illustrated in FIG. 3 shown with the horizontal vanes in the open position.

The woven material 10 as shown in FIG. 1 can be incorporated into all different types of coverings for architectural features without limitation. For example, referring to FIGS. 3-4, one example of a covering 100 made in accordance with the present disclosure is shown. The covering 100 includes a panel 102 including a support structure 104 and a plurality of vanes 106 connected to the support structure 104. The vanes 106 can be moved between a closed position, as shown in FIG. 3, and an open position, as shown in FIG. 4. The support structure 104 is in the form of a flexible sheet of sheer fabric, e.g., a woven light transmitting material 10 as described above. The support structure 104 is suspended along its top edge 110 from a roller 118. The support structure 104, such as the woven light transmitting material 10, may form a backing layer to which the plurality of vanes 106 are coupled, e.g., as shown in FIGS. 3 and 4.

The roller 118, headrail 120 and panel 102 make up the covering 100 of the present invention.

The plurality of elongated vanes 106 are strips of material that are horizontally suspended from a front face of the support sheet 104 at vertically spaced locations to form bulbous loops supported from the front face of the support sheet 104. Each vane 106 is made of a semi-rigid or flexible material. Each vane 106 droops downwardly in a closely spaced relationship with the support sheet 104 when the vanes 106 are in the closed position shown in FIG. 3. The bottom edge of each vane 106 slidably coupled to the support sheet 104 such that each vane 106 can be moved to the open position as shown in FIG. 4, in which there are gaps 112 between the vanes 106 that expose the support sheet 104. In the closed position, each vane 106 can be seen to be generally flat and parallel with the support sheet 104. In some embodiments, the plurality of elongated vanes 106 are formed by a facing layer of material, e.g., fabric material. The panel 102 and covering 122 further include the plurality of flexible, vertically extending operating elements 108 which are horizontally spaced across the width of the panel with the upper ends of the operating elements being secured to the roller 118. When the operating elements 108 are lifted, the lower edge of each vane 106 is lifted synchronously so as to define a gap or open space 112 between vanes through which vision and light are permitted.

EXAMPLE

A sample woven material was prepared according to the present invention to demonstrate the advantageous inherent resistance to fraying or unraveling thereof. The woven material was constructed with the plain weave arrangement of FIG. 1 to form a sheer organza fabric, i.e., a woven light transmitting material. The yarns used to fabricate the woven light transmitting material were 20 denier yarns formed of textured 100% polyester monofilament yarns having a low melting temperature of 200° C. The woven light transmitting material had an average yarn number of 27.72 yarns per centimeter. The woven fabric was heat set at a temperature of 200° C. for a 2.5 minute dwell time in order to fuse the yarns into a fine mesh having bonds at the crossover points. The woven light transmitting material had a basis weight of 18 gsm. Due to the bonds formed by the low melt polyester monofilament yarns at the crossover points, the woven light transmitting material was inherently resistant to unraveling or fraying when cold cut. No heat seal bead or cauterized edge was formed along the cold cut edges.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed:

1. A woven material for use in architectural coverings that is inherently resistant to unraveling, said woven material comprising:

a non-laminated woven fabric having longitudinal edges and lateral edges, said woven fabric comprising warp yarns and weft yarns, said weft yarns intersecting with said warp yarns to define crossover points, at least some of said warp yarns and at least some of said weft yarns comprising binder yarns, said binder yarns defining an outer surface made from a low melting temperature polymer, wherein said binder yarns are bonded with adjacent yarns at said crossover points for preventing said woven fabric from unraveling along said longitudinal edges, wherein the woven fabric is a sheer fabric.

2. The woven material as defined in claim 1, wherein said woven fabric comprises interstitial openings between intersecting yarns.

3. The woven material as defined in claim 1, wherein said binder yarns comprise monofilament yarns.

4. The woven material as defined in claim 1, wherein said binder yarns comprise multifilament yarns.

5. The woven material as defined in claim 1, wherein said binder yarns comprise spun yarns.

6. The woven material as defined in claim 5, wherein said binder yarns are spun yarns having a yarn count of less than or equal to about Ne 200 and greater than or equal to about Ne 6.

7. The woven material as defined in claim 1, wherein said binder yarns have a denier of less than or equal to about 600 and greater than or equal to about 10.

8. The woven material as defined in claim 1, wherein said woven material is a sheer fabric, further wherein said binder yarns have a denier of less than or equal to about 30 and greater than or equal to about 10.

9. The woven material as defined in claim 1, wherein all of said warp yarns and all of said weft yarns comprise said binder yarns.

10. The woven material as defined in claim 1, wherein said low melting temperature polymer comprises a polyester polymer.

11. The woven material as defined in claim 1, wherein said low melting temperature polymer has a melting point of less than or equal to about 220° C.

12. The woven material as defined in claim 1, wherein the binder yarns are formed from monocomponent fibers.

13. The woven material as defined in claim 1, wherein the binder yarns are formed from bi-component fibers.

14. The woven material as defined in claim 1, wherein said woven fabric has a basis weight of greater than or equal to about 10 gsm and less than or equal to about 175 gsm.

15. The woven material as defined in claim 1, wherein said woven fabric is a sheer fabric that has a basis weight of greater than or equal to about 10 gsm and less than or equal to about 28 gsm.

16. The woven material as defined in claim 1, wherein said woven fabric has a yarn density such that there are greater than or equal to about 22 warp yarns per centimeter and less than or equal to about 38 warp yarns per centimeter and there are greater than or equal to about 22 weft yarns per centimeter and less than or equal to about 38 weft yarns per centimeter.

17. The woven material as defined in claim 1, wherein the binder yarns are textured.

18. The woven material as defined in claim 1, wherein said woven fabric has a plain basket weave.

19. The woven material as defined in claim 1, wherein said binder yarns are solution dyed.

20. The woven material as defined in claim 1, wherein the woven material has a longitudinal cut edge that is not cauterized.

21. An architectural covering comprising:

a facing layer spaced from a backing layer, a sheer woven material as defined in claim 1 comprising said facing layer or said backing layer of said architectural covering.

22. An architectural covering comprising:

a backing layer comprising a sheer woven material as defined in claim 1, said backing layer extending in a longitudinal direction; and a plurality of horizontally-oriented vane elements spaced along said longitudinal direction of said backing layer, each of said vane elements including first and second parallel edges that are perpendicular to said longitudinal direction, said second edge being moveable towards and away from said first edge for selectively controlling a spacing between the vane elements.

* * * * *